United States Patent Office 3,524,705
Patented Aug. 18, 1970

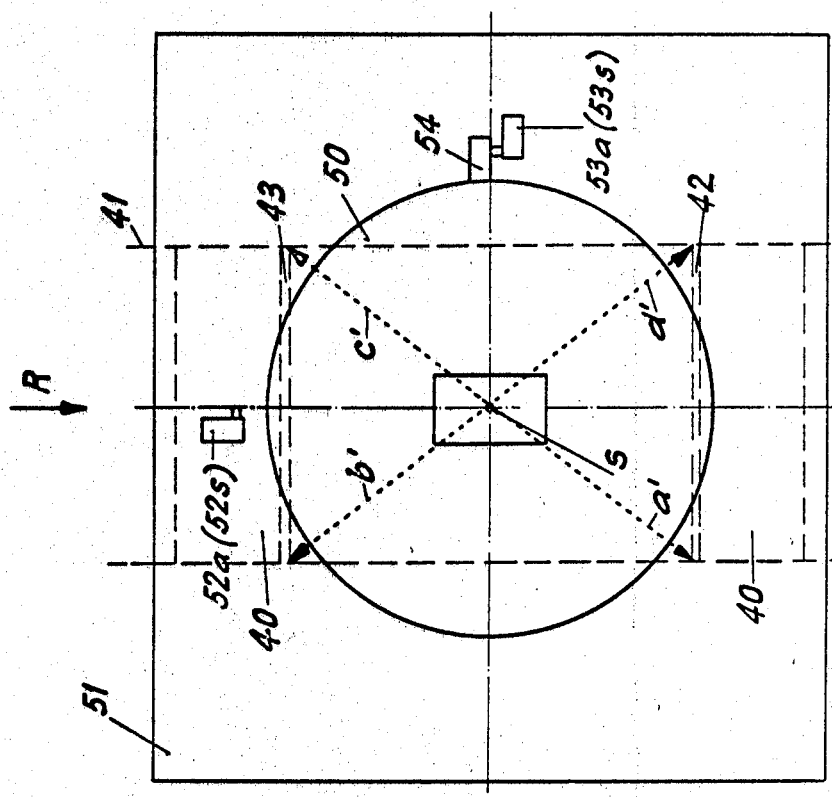
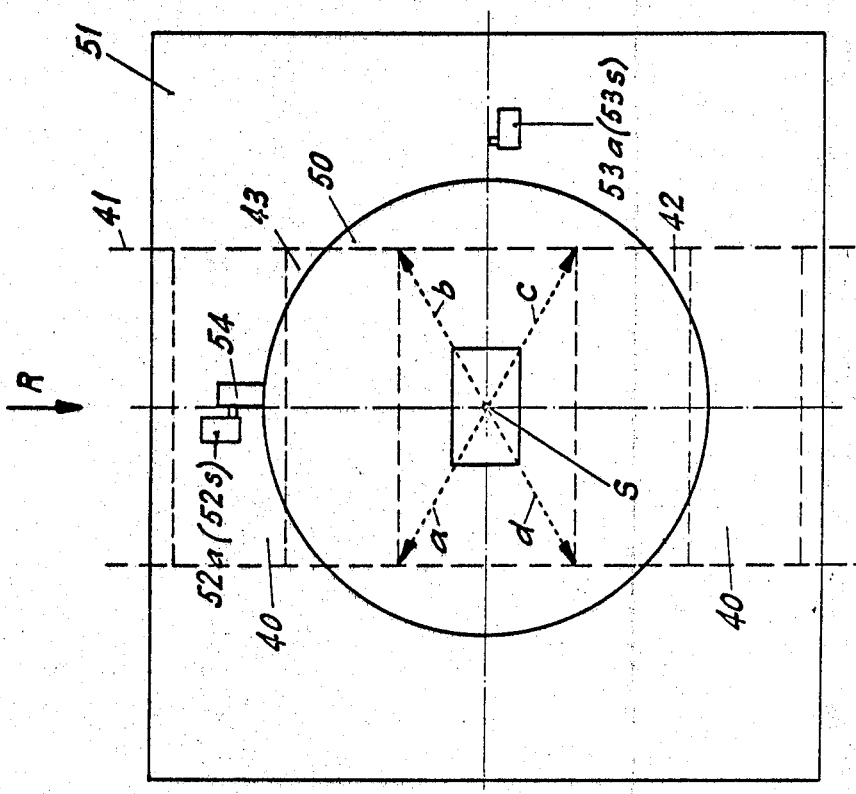

3,524,705
PROJECTING APPARATUS FOR COPIERS
Peter Steffen, Dietikon, Zurich, Hermann Keller, Oberengstringen, and Reinhard Zeindler, Zurich, Switzerland, assignors to Ciba Limited, Basel, Switzerland, a Swiss company
Filed Nov. 27, 1967, Ser. No. 685,916
Claims priority, application Switzerland, Dec. 2, 1966, 17,268/66
Int. Cl. G03b 27/32
U.S. Cl. 355—55   10 Claims

ABSTRACT OF THE DISCLOSURE

A photographic enlarger for producing enlargements of two different sizes each of which can be printed consecutively on a reel of printing material comprising a rectangular mask for holding the negative, two lenses of of different focal lengths and a rectangular positive mask. When the major axis of the negative mask lies transverse to the direction of feed of printing material the dimension of the positive mask is also reduced in the direction of feed of printing material and the lens of longer focal length placed in the opical axis. When the major axis of the negative mask lies parallel to the direction of feed of printing material the opposite occurs.

---

This invention relates to photographic enlargers.

One object of the invention is so to provide an enlarger so that enlargements of two different sizes can be printed consecutively on the same reel of printing material, and preferably, in such a way that both prints occupy the full width of the reel.

According to the invention for achieving this object, there is provided in a photographic enlarger comprising a frame and having mounted thereon, a first mask having a major axis and a minor axis, said first mask serving as a holder for a negative or a positive which is to be enlarged, two objective lenses of different focal lengths, a second mask, means for adjusting the size of the second mask, said first and second masks lying on an optical axis, means for moving one or other of said objective lenses into said optical axis between the first and second masks and means for moving printing material past the second mask adjacent the side of the seocnd mask remote from the first mask, the improvement wherein the first mask is rotatable about said optical axis between a first position wherein the major axis is substantially parallel to the intended direction of movement of the printing material and a second position at right angles to said first position and wherein the major axis is substantially transverse to the intended direction of movement of the printing material, and wherein the means for adjusting the size of the second mask consists of means for altering the dimension of the second mask between a larger and a smaller value which dimension is parallel to the intended direction of movement of the printing material, means coupling the first mask the means for adjusting the size of the second mask and the means for moving the objective lenses so that when the first mask is in its first position, the lens of shorter focal length will be positioned in the optical axis and the said dimension of the second mask will have the larger value and so that when the first mask is in its second position the lens of longer focal length will be positioned in the optical axis and the said dimension of the second mask will have the smaller value.

In a preferred embodiment of the invention the two lenses are mounted on means movable between a first position wherein one lens is in the optical axis and a second position wherein the other lens is in the optical axis, said enlarger further comprising first and second stop means arresting the movement of said lens mounting means in said first and second positions respectively, third and fourth stop means arresting the movement of said first mask in the first and second positions respectively of said first mask and first, second, third and fourth switch means comprised in said first, second, third and fourth stop means respectively, and actuable when said stop means are engaged, said coupling means comprising a circuit means controllable by said switch means.

Preferably, the arangement may be such that the means for moving one or other of the lenses into the optical axis comprises D.C. motor means including a drive shaft and the means for altering said dimension of the second mask comprises electromagnet means said motor means being connectable through said first and third switch means to a current supply of one polarity when the first mask is in its first position and connectable through said second and fourth switch means to a current supply of opposite polarity when said first mask is in its second position said electromagnet means being connectable to a current supply for energisation thereof through said fourth switch means when said first mask is not in its second position, said first and second switch means being opened when said first and second stop means respectively are engaged.

A specific embodiment of the invention will now be described by way of example with reference to the accompanying drawings in which:

FIGS. 5a and 5b show the negative holder in each of its two alternative positions, seen in plan (from the objective side) and, FIG. 6 is an electrical circuit diagram of a system for coupling the negative mask, the objective changer and the size-changing mechanism of the positive mask.

Figure 1:
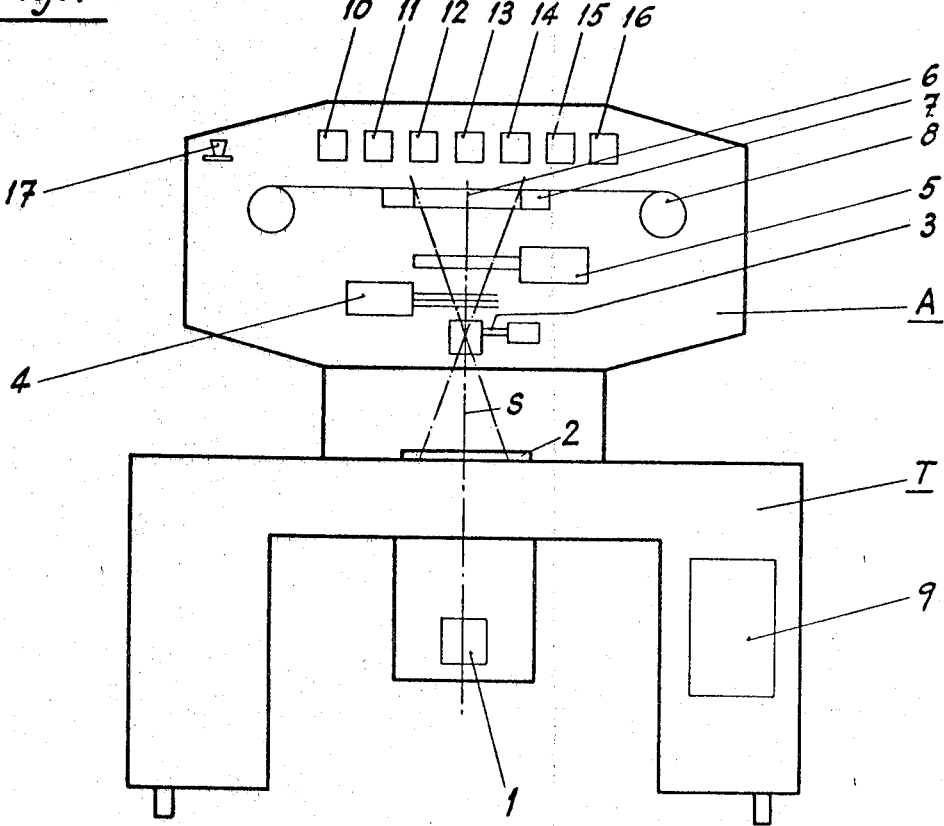
FIG. 1 is a schematic general representation of the photographic enlarger.

The automatic photographic enlarger illustrated in FIG. 1 comprises two principal parts: a desk-shaped bottom part T and an upper part A which is mounted on the desk shaped bottom part. A negative holder 2 and a light source 1 of the projection equipment, of which the optical axis is indicated by S, are mounted in the bottom part T, whereas an objective changer 3, a positive mask 6 having movable edges 7 and feed means 8 for the band of printing material are comprised in the upper part A. FIG. 1 of the drawing also indicates the following additional components: a set of printing filters 4, a shutter 5, elctronics 9 and seven visual signaling devices 10 to 16, preferably in the form of flashers and so associated with the electronics 9 of the printer that all the functions of the apparatus can be monitored at any time and faults located immediately. In detail the visual signalling devices are associated with the following functions: 10, overall voltage control; 11 projector light source 1; 12, centre shutter 5; 13, printing filters 4; 14, edge exposure 7; 15, frame combination and 16, printing paper feed 8. Each signalling device continues to flash until the fault responsible for the signal has been eliminated. Operation of the enlarger is blocked by the electronics for as long as the fault is not rectified.

Figure 2:
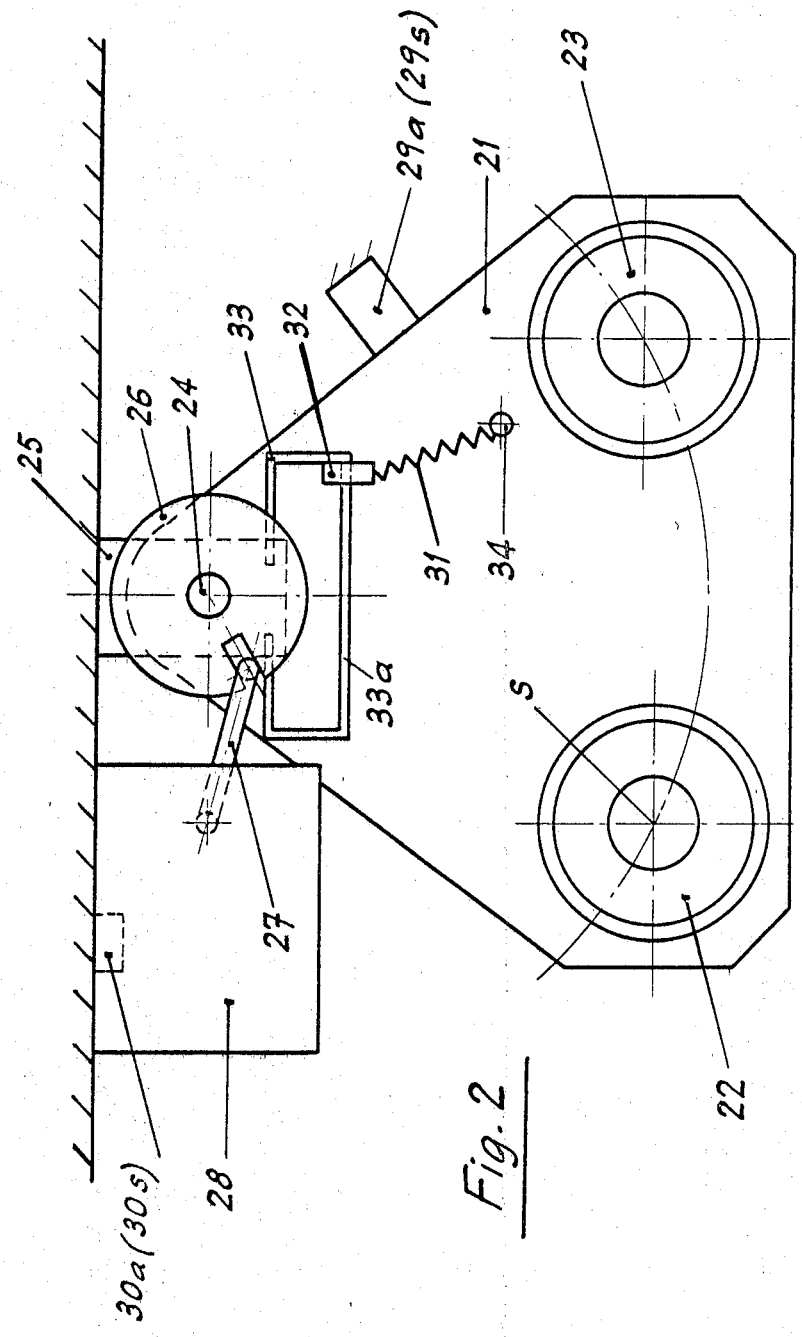
FIG. 2 is a preferred embodiment of the objective changer seen in plan.
Figure 3:
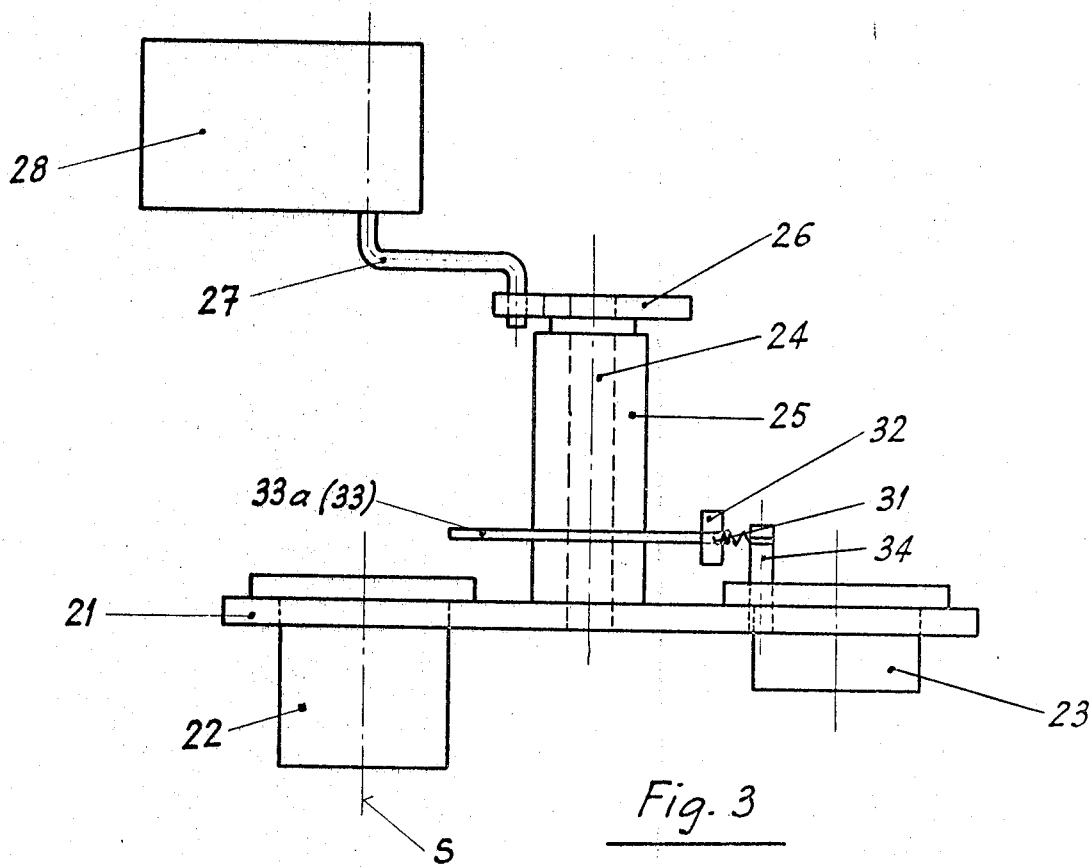
FIG. 3 is an elevational view of FIG. 2.

As illustrated in FIGS. 2 and 3 the objective changer (3 in FIG. 1) comprises a carrier plate 21 for two threadedly mounted objectives 22 and 23. The carrier plate is fast on a short shaft 24 rotatably mounted in a bearing bracket 25. The shaft 24, extends upwardly beyond the bearing bracket 25, its extended end carrying a disc 26 which is fast on the shaft. The disc is radially slotted for the reception of one end of a crank arm 27 in the slot. The other end of the arm is coupled to the drive shaft of a reversible electric motor 28. Rotation of the objective carrier 21 is angularly limited by two stops 29a and 30a, preferably associated with limit switches (29s, 30s) for the motor. The objective carrier 21 is loaded by a spring 31 which is so attached to a suspension that it will pull the carrier against the relative stop in either of its end positions. Conveniently one end of the spring, particularly the end not attached to the carrier, is fastened to a moveable element which is slidably displaceable between two fixed stops when the carrier is rotated, in such manner that the line of action of the spring passes the shaft 24 of the objective carrier on the right hand side when the carrier is at the right-hand stop and on the left hand side when the carrier is at the left-hand stop. In the illustrated example the sliding element is a ring 32 which is slidably movable on the free longitudinal bar 33a of a rectangular frame 33 affixed to the bearing bracket 25, the corners of the frame serving as the lateral stops. The other end of the spring is attached to a pin 34 affixed to the carrier.

Figure 4A:
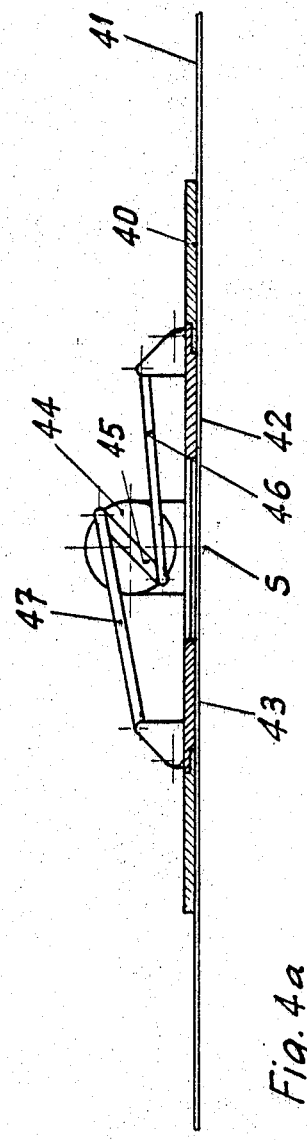
FIGS. 4a and 4b show a preferred embodiment of the changeable size positive mask in each of its two alternative positions, both figures being sections in the direction of feed of the band of printing material.
Figure 4B:
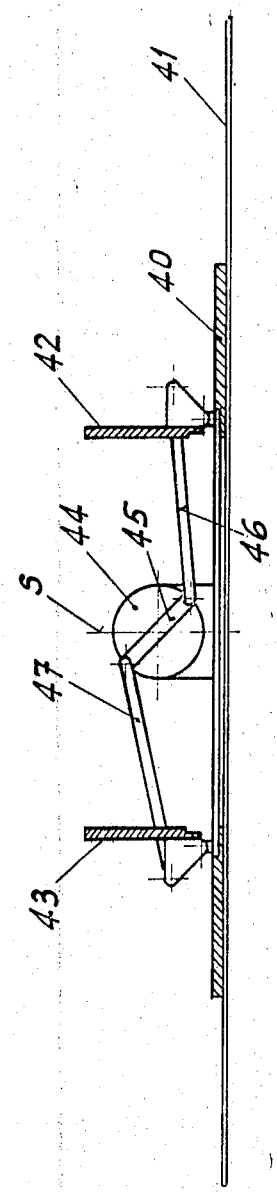

As illustrated in FIGS. 4a and 4b the positive mask (6 in FIG. 1) and its associated mechanism for two different masking sizes consist of a frame 40 and of a narrow flap 42 and 43 hingeably attached to each of the frame edges extending across the direction of feed of the printing material 41. The flaps can be deflected about their respective hinges into positions parallel and perpendicular to the frame by a rotatable electromagnet 44 and a crank and rod linkage 45, 46, 47. Preferably this mechanism is so contrived that the flaps 42 and 43 are deflected into the frame to reduce the size of the mask when the magnet is not energised. This position of the flaps is shown in FIG. 4a whereas FIG. 4b shows the flaps deflected by the energised magnet and the mask opened to its larger size.

FIGS. 5a and 5b represent the negative mask (2 in FIG. 1) in its two alternative working positions. The positive mask 40, 42, 43 which is seen behind the negative mask and the feed path 41 of the printing material are indicated by dashed lines. The projected rays of light to the corners of the mask are represented by dotted arrowed lines a, b, c, d (in FIG. 5a) and a', b', c' d' (in FIG. 5b) respectively. The arrow R indicates the direction of feed of the printing material. The negative mask 50 (2 in FIG. 1) which also serves as a holder is mounted in a baseplate 51 for rotation about the optical axis S between two relatively normal end positions defined by fixed stops 52a and 53a respectively co-operating with an intercepting arm 54 on the negative mask adapted to operate limit switches 52s and 53s associated with the stops 52a and 53a respectively.

Figure 6:
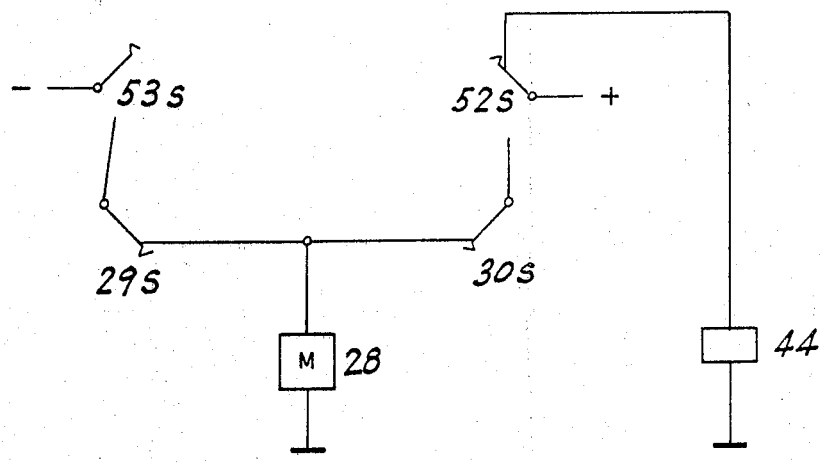

The electrical circuit which connects the negative mask (FIGS. 5a, 5b), the objective changer (FIGS. 2 and 3) and the positive mask (FIGS. 4a and 4b) is shown in FIG. 6 where in agreement with FIGS. 2, 3, 4a, 4b, 5a and 5b the reference numerals 28 indicate the motor, 44 the magnet actuating the size changer mechanism of the positive mask, 29s and 30s the two motor limit switches and, 52s and 53s the two limit switches associated with the negative mask. The system is controlled as follows by manually rotating the negative mask:

Whilst the negative mask is in an intermediate position, i.e. the intercepting arm 54 not in contact with either of the two limit switches 52s or 53s (of FIGS. 5a, 5b) the switches 52s and 53s will be in the position shown in FIG. 6. Assuming that the objective carrier plate 21 (FIGS. 1, 2) is not in contact with either of the associated stops 29a or 30a, the two switches 29s and 30s will be closed. In the illustrated position of switch 52s the magnet 44 is energised and the positive mask is therefore in the position illustrated in FIG. 4b (larger size). However, as soon as the negative mask 50 has been rotated far enough to actuate the limit switch 52s, the motor 28 will rotate the carrier plate 21 and open the switch 30s. At the same time the magnet 44 is no longer energised as a result of switch 52s having been opened. Hence, when the negative mask is in the position according to FIG. 5a (crosswise position) the positive mask assumes the position in FIG. 4a (for the smaller size) and the objective changer turning into that position in which the objective 23 of longer focal length (smaller reproduction ratio) is aligned in the optical axis. If it is now desired to change the size of the print the operator need merely rotate the negative mask 50 until the intercepting arm 54 strikes the limit switch 53s. This is the position illustrated in FIG. 5b. In view of the position of switch 52s the positive mask will take up the position shown in FIG. 4b (larger size) and the motor 28 will operate to swing the other objective 22 (shorter focal length) into the optical axis S.

Operation of the magnet 44 simultaneously changes the length of feed step of the reel of printing paper 41 and advances the paper accordingly. Consequently there will be no waster of paper nor can overlap between consecutive pictures occur.

As already mentioned above, the arrangement according to the invention also permits two enlargements of different size to be printed consecutively on the same band of paper. Consequently the enlargements can be developed under the same conditions and it is to be expected that no colour differences will appear between the two prints.

The negative mask and holder may be used as a positive mask and holder when copies are to be made from transparencies.

What is claimed is:

1. In a photographic enlarger comprising a frame and having mounted thereon a first mask having a major axis and a minor axis, said first mask serving as a holder for a negative or a positive which is to be enlarged, two objective lenses of different focal lengths, a second mask, means for adjusting the size of the second mask, said first and second masks lying on an optical axis, means for moving one or other of said objective lenses into said optical axis between the first and second masks and means for moving printing material past the second mask adjacent the side of the second mask remote from the first mask, the improvement wherein the first mask is rotatable about said optical axis between a first position wherein the major axis is substantially parallel to the intended direction of movement of the printing material and a second position at right angles to said first position and wherein the major axis is substantially transverse to the intended direction of movement of the printing material, and wherein the means for adjusting the size of the second mask consists of means for altering the dimension of the second mask between a largr and a smaller value which dimension is parallel to the intended direction of movement of the printing material, means coupling the first mask, the means for adjusting the size of the second mask and the means for moving the objective lenses so that when the first mask is in its first position, the lens of shorter focal length will be positioned in the optical axis and the said dimension of the second mask will have the larger value and so that when the first mask is in its second position, the lens of longer focal length will be positioned in the optical axis and the said dimension of the second mask will have the smaller value.

2. The enlarger of claim 1, wherein the two lenses are mounted on means movable between a first position wherein the lens is in the optical axis and a second position wherein the other lens is in the optical axis, said enlarger further comprising first and second stop means arresting the movement of said lens mounting means in said first and second positions respectively, third and fourth stop means arresting the movement of said first mask in the first and second positions respectively of said first mask and first, second, third and fourth switch means comprised in said first, second, third and fourth stop means respectively and actuable when said stop means are engaged, said coupling means comprising circuit means controllable by said switch means.

3. The enlarger of claim 2, wherein the means for moving one or other of the lenses into the optical axis comprises D.C. motor means including a drive shaft, and the means for altering said dimension of the second mask comprises electromagnet means, said motor means being connectable through said first and third switch means to a current supply of one polarity when the first mask is in its first position and connectable through said second and fourth switch means to a current supply of opposite polarity when said first mask is in its second position, said electromagnet means being connectable to a current supply for energisation thereof through said fourth switch means when said first mask is not in its second position, said first and second switch means being opened when said first and second stop means respectively are engaged.

4. The enlarger of claim 3, wherein the means mounting the two lenses comprises a carrier plate pivotably mounted on said enlarger frame about a pivot axis, a crank linkage coupling said carrier plate to the drive shaft of said D.C. motor means, and a spring having one end coupled to the carrier plate and the other end coupled to the enlarger frame so as to urge the carrier plate against the first stop means when the carrier plate is in its first position and against the second stop means when the carrier plate is in its second position.

5. The enlarger of claim 4, wherein said other end of the spring is slidably coupled to the enlarger frame so that the line of action of said spring may move to either side of said pivot axis.

6. The enlarger of claim 5, wherein the means for altering the dimension of the second mask comprises two flaps hingedly fixed to said second mask, a crank and rod linkage coupling the flaps to the electromagnet means for raising and lowering said flaps.

7. In a photographic enlarger comprising a frame and having mounted thereon a first mask having a major axis and a minor axis, said first mask serving as a holder for a negative or a positive which is to be enlarged, two objective lenses of different focal lengths; a second mark, means for adjusting the size of the second mask, said first and second masks lying on an optical axis, said lenses being mounted on means movable between a first position wherein one lens is in the optical axis and a second position wherein the other lens is in the optical axis, means for moving printing material past the second mask adjacent the side of the second mask remote from the first mask, the first mask being rotatable about said optical axis between a first position wherein the major axis is substantially parallel to the intended direction of movement of the printing material and a second position at right angles to said first position wherein the major axis is substantially transverse to the intended direction of movement of the printing material, the means for adjusting the size of the second mask consisting of means for altering the dimension of the second mask between a larger and a smaller value which dimension is parallel to the intended direction of movement of the printing material, means coupling the first mask, the means for adjusting the size of the second mask and the means for moving the objective lenses so that when the first mask is in its first position, the lens of shorter focal length will be positioned in the optical axis and the said dimension of the second mask will have the larger value and so that when the first mask is in its second position, the lens of longer focal length will be positioned in the optical axis and the said dimension of the second mask will have the smaller value, said enlarger further comprising first and second stop means arresting the movement of said lens mounting means in said first and second positions respectively, third and fourth stop means arresting the movement of said first mask in the first and second positions respectively of said first mask, said first, second, third and fourth stop means including first, second, third and fourth switch means respectively which are actuable when said stop means are engaged, said coupling means comprising circuit means controllable by said switch means, said means for moving one or other of the lenses into the optical axis comprises D.C. motor means including a drive shaft, and the means for altering said dimension of the second mask comprises electromagnet means, said motor means being connectable through said first and third switch means to a current supply of one polarity when the first mask is in its first position and connectable through said second and fourth switch means to a current supply of opposite polarity when said first mask is in its second position, said electromagnet means being connectable to a current supply for energization thereof through said fourth switch means when said first mask is not in its second position, said first and second switch means being opened when said first and second stop means respectviely are engaged.

8. The enlarger of claim 7, wherein the means mounting the two lenses comprises a carrier plate pivotally mounted on said enlarged frame about a pivot axis, a crank linkage coupling said carrier plate to the drive shaft of said D.C. motor means, and a spring having one end coupled to the carrier plate and the other end coupled to the enlarger frame so as to urge the carrier plate against the first stop means when the carrier plate is in its first position and against the second stop means when the carrier plate is in its second position.

9. The enlarger of claim 8, wherein said other end of the spring is slidably coupled to the enlarger frame so that the line of action of said spring may move to either side of said pivot axis.

10. The enlarger of claim 9, wherein the means for altering the dimension of the second mask comprises two flaps hingedly fixed to said second mask, a crank and rod linkage coupling the flaps to the electromagnet means for raising and lowering said flaps.

References Cited

UNITED STATES PATENTS

| | | | |
|---|---|---|---|
| 3,283,648 | 11/1966 | Froese | 355—55 X |
| 3,292,485 | 12/1966 | Mey | 355—56 X |
| 3,402,635 | 9/1968 | Jacknau et al. | 355—63 X |

NORTON ANSHER, Primary Examiner

R. A. WINTERCORN, Assistant Examiner

U.S. Cl. X.R.

355—61, 63

PO-1050
(5/69)

UNITED STATES PATENT OFFICE
CERTIFICATE OF CORRECTION

Patent No. 3,524,705                     Dated August 18, 1970

Inventor(s) Peter Steffen, Hermann Keller and Reinhard Zeindler

It is certified that error appears in the above-identified patent and that said Letters Patent are hereby corrected as shown below:

Claim 2, line 3 - change "wherein the lens" to
-- wherein one lens --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents